(No Model.)
W. T. MOORE & G. R. JACKSON.
SAWING MACHINE.
No. 287,951. Patented Nov. 6, 1883.
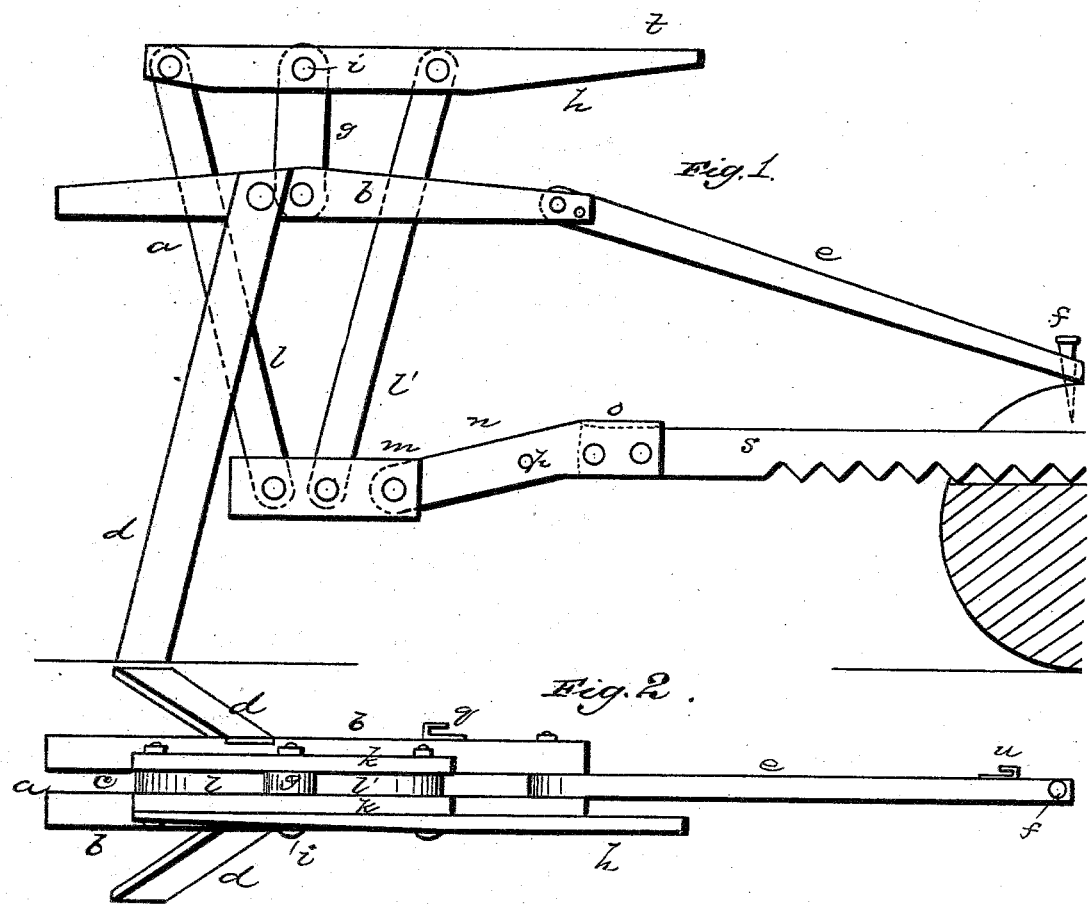

UNITED STATES PATENT OFFICE.

WILLIAM T. MOORE AND GEORGE R. JACKSON, OF RICHVIEW; SAID JACKSON ASSIGNOR TO CONRAD J. GEIGER AND CHAUNCEY B. GEIGER, OF ASHLEY, ILLINOIS.

SAWING-MACHINE.

SPECIFICATION forming part of Letters Patent No. 287,951, dated November 6, 1883.

Application filed April 9, 1883. (No model.)

*To all whom it may concern:*

Be it known that we, WILLIAM T. MOORE and GEORGE R. JACKSON, citizens of the United States, residing at Richview, in the county of Washington and State of Illinois, have invented certain new and useful Improvements in Sawing-Machines; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view of our machine, and Fig. 2 is a top view of the same.

This invention has relation to saws; and it consists in the construction and novel arrangement of devices hereinafter fully described, and particularly pointed out in the claim appended.

Referring by letter to the accompanying drawings, $a$ designates the bench or frame, composed of two parallel beams, $b\ b$, having a space, $c$, between them. At the front end of this bench or frame, which is mounted on two inclined diverging legs, $d\ d$, is pivoted an arm, $e$, having vertical perforations at its forward end for the reception of a spike or dog, $f$.

Toward the rear end of the bench $a$ a vertical arm, $g$, is bolted between the beams $b\ b$, and extends upward therefrom, to form at its upper end the fulcrum for the hand-lever $h$, which is pivoted thereto by a bolt, $i$. This hand-lever $h$ is composed of two parallel arms, $k\ k$, one on each side of the vertical arm $g$, between which, at each end, are pivoted downwardly-converging arms $l\ l'$, connected at their lower ends by short parallel bars $m\ m$, bolted thereto, between which, at their forward ends, is pivoted the saw-helve $n$, provided with the lateral flange $o$ near its forward end, and the perforation $p$, for the reception of a hook on the lower end of a chain suspended from a hook, $q$, projecting from one of the beams $b$, to support the helve and saw in an elevated position while being transported from place to place. The saw $s$ is bolted to the helve or shank $n$ in any substantial manner. The hand-lever $h$ has also the handle $t$ bolted to one of the arms $l$, so that by moving this handle up and down a reciprocating motion will be imparted to the saw. A guide-hook, $u$, is provided at one side of the pivoted arm $e$, near its forward end, to guide the saw before it forms the kerf in the log, the dog $f$ being first driven into the log to be sawed.

We have found by actual experiment with this construction of saw that one man can accomplish with ease as much work as four men can do with the crosscut-saws as ordinarily constructed.

Having thus fully described our invention, what we claim as new, and desire to secure by Letters Patent, is—

The bench or frame $a$, composed of the horizontal parallel beams $b\ b$, mounted upon the diverging legs $d\ d$, secured to said beams near their rear ends, the vertical arm $g$, bolted between said beams $b\ b$, slightly in front of the diverging legs $d\ d$, and the arm $e$, pivoted between the beams $b\ b$ at their forward ends, said arm $e$ being perforated vertically at its forward end, and provided with a removable dog, $f$, in combination with the hand-lever $h\ t$, pivoted to the upper end of the vertical arm $g$, the downwardly-converging bars $l\ l'$, pivoted at their upper ends between the bars $k\ k$ of the hand-lever and at their lower ends between the parallel bars $m\ m$, between the forward ends of which the saw-helve $n$ is pivoted, and the saw $s$, substantially as specified.

In testimony whereof we affix our signatures in presence of two witnesses.

WILLIAM T. MOORE.
GEORGE ROBERT JACKSON.

Witnesses:
ELIJAH HUSSEY,
T. B. AFFLAIK.